(No Model.)

O. OLSON.
FILE OR RASP.

No. 593,028. Patented Nov. 2, 1897.

Witnesses,

Inventor,
Otto Olson

UNITED STATES PATENT OFFICE.

OTTO OLSON, OF REDDING, CALIFORNIA.

FILE OR RASP.

SPECIFICATION forming part of Letters Patent No. 593,028, dated November 2, 1897.

Application filed January 27, 1897. Serial No. 620,876. (No model.)

*To all whom it may concern:*

Be it known that I, OTTO OLSON, a citizen of Sweden, residing at Redding, county of Shasta, State of California, have invented an Improvement in Files or Rasps; and I hereby declare the following to be a full, clear, and exact description of the same.

My invention relates to an improved tool for eroding or cutting away surfaces.
It is especially applicable for the manufacture of coarse rasps and files, and may also be employed for smooth-cutting tools.

It consists, essentially, of a holder and a series of curved cutting tools or bits, with means for removably securing them in the holder so as to present the cutting edges in position for work.

Figure 1:
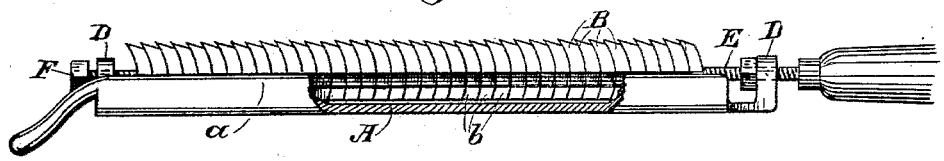
Figure 2:
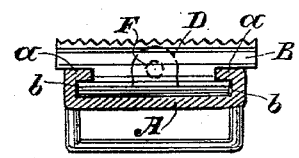
Figure 3:
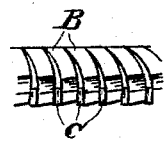

Referring to the accompanying drawings, Figure 1 is a side view of my file or rasp.
Fig. 2 is a cross-section through the same. Fig. 3 shows the position of the bits while being sharpened.

A is a holder, which is shown in the present case consisting of a back of sufficient width with turned-over edges $a$.

The bits or cutters B are in the present case shown with toothed edges formed upon one edge of a hollow concaved surface of steel, the back being correspondingly convex and the edge beveled toward the teeth, so that the latter may be sharpened by simply grinding this edge. The opposite edge of the bit is formed with lugs $b$ and an intervening groove or channel between these lugs and the bit. This groove or channel fits the turned-over edges of the holder, and each of the bits or cutters may be slipped into the holder, one following the other, until the holder is filled with these bits lying closely against each other, and the cutting edges projecting in series transversely across the face.

The bits are separated from each other by means of small wedges C, which are dropped in between the cutters, so as to bring the edges up to a perfect uniform level to be sharpened.

The opposite ends of the holder are turned up, as shown at D, and through these turned-up ends pass the screw-shanks E of the handle at one end and a corresponding screw F at the opposite end. These screws may be turned so as to bind the cutters firmly in place, and the tool is then in condition for use without wedges.

If it is desired to remove or change the cutters, it can be done by simply loosening the screws and removing the cutters, and they may be inserted in the same manner when the screws are turned back sufficiently for the purpose.

To sharpen the cutters, the wedges C are placed between the bases of the cutters to bring the beveled faces in the same plane, where they are locked until ground, then the wedges removed and the cutters locked together for use with the cutting edges slightly raised, as in Fig. 1.

The advantage of making the cutters or bits curved instead of straight is that on the introduction of the wedges between the cutters the edges of the cutters are all brought into one plane for sharpening. When a wedge is placed between two cutters, their bases are separated by the thickness of the wedge, and on their being clamped together the upper portion of the rearmost cutter is thrown forward by reason of the point of the clamping-screw being above the top of the wedge, and the surfaces of two or more cutters are thus brought into the same plane, the same result following the insertion of each additional wedge. If the cutters were straight, the interposed wedges would merely separate them by a distance corresponding with the thickness of the wedge and they would retain their upright position and their surfaces would not readily be brought into the same plane for grinding.

Having thus described my invention, what I claim as new, and desire to secure by Letters Patent, is—

1. An improved cutting-tool or file consisting of a holder having at its opposite ends upturned threaded lugs, and having upturned sides provided with inwardly-turned edges, a series of bits or cutters fitted within the holder and having grooves or channels to receive the inturned edges of the holder, said bits or cutters being of curved form in cross-section and having beveled edges, and a screw at each end of the holder adjustably fitted to the upturned lugs thereof and abutting against the cutters to secure them firmly in place.

2. The combination with an abrading or cutting tool having a series of independent bits or cutters placed face to face, of means for facilitating the sharpening of the bits or cutters consisting of wedges placed between the bases of the bits or cutters to bring their opposite faces in the same plane.

In witness whereof I have hereunto set my hand.

OTTO OLSON.

Witnesses:
F. M. SWASEY,
C. E. WILLIAMS.